May 12, 1953  C. B. RICHEY  2,637,966
TRACTOR SUPPORT FOR MOWERS
Filed April 2, 1949  5 Sheets-Sheet 1
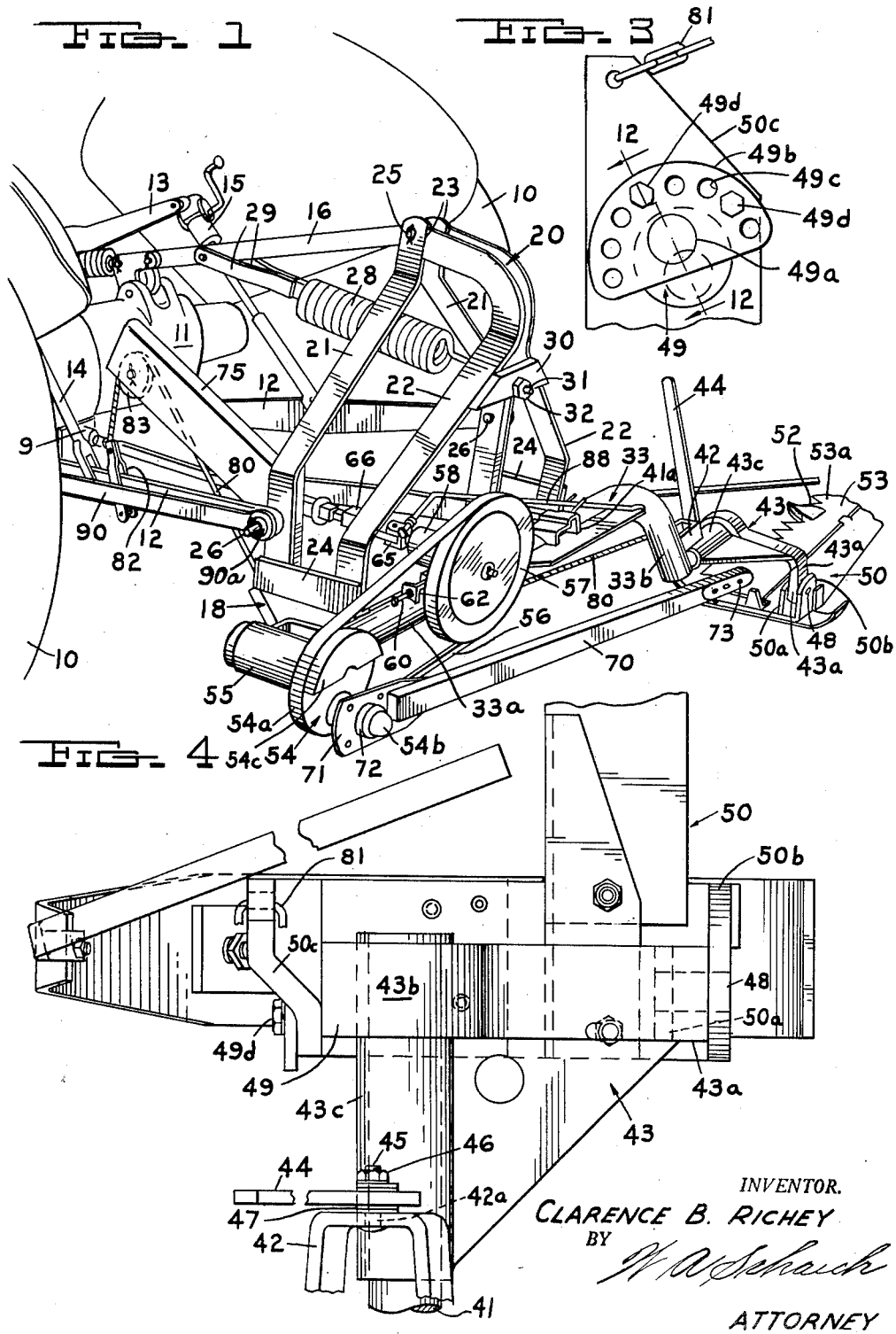
INVENTOR.
CLARENCE B. RICHEY
BY
W. A. Schach
ATTORNEY May 12, 1953   C. B. RICHEY   2,637,966
TRACTOR SUPPORT FOR MOWERS
Filed April 2, 1949   5 Sheets-Sheet 2
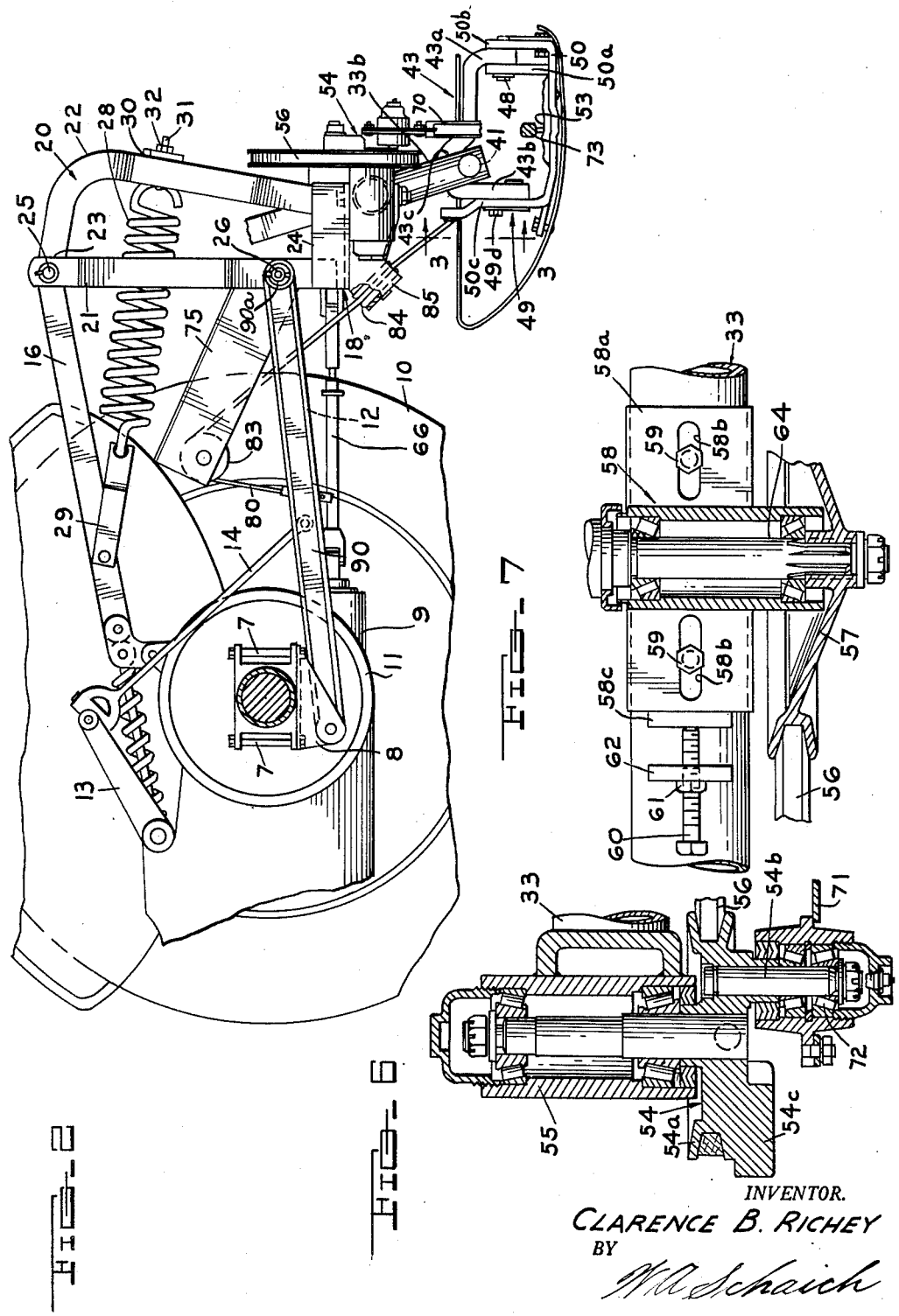
INVENTOR.
CLARENCE B. RICHEY
BY
W. U. Schaich
ATTORNEY May 12, 1953  C. B. RICHEY  2,637,966
TRACTOR SUPPORT FOR MOWERS
Filed April 2, 1949  5 Sheets-Sheet 3
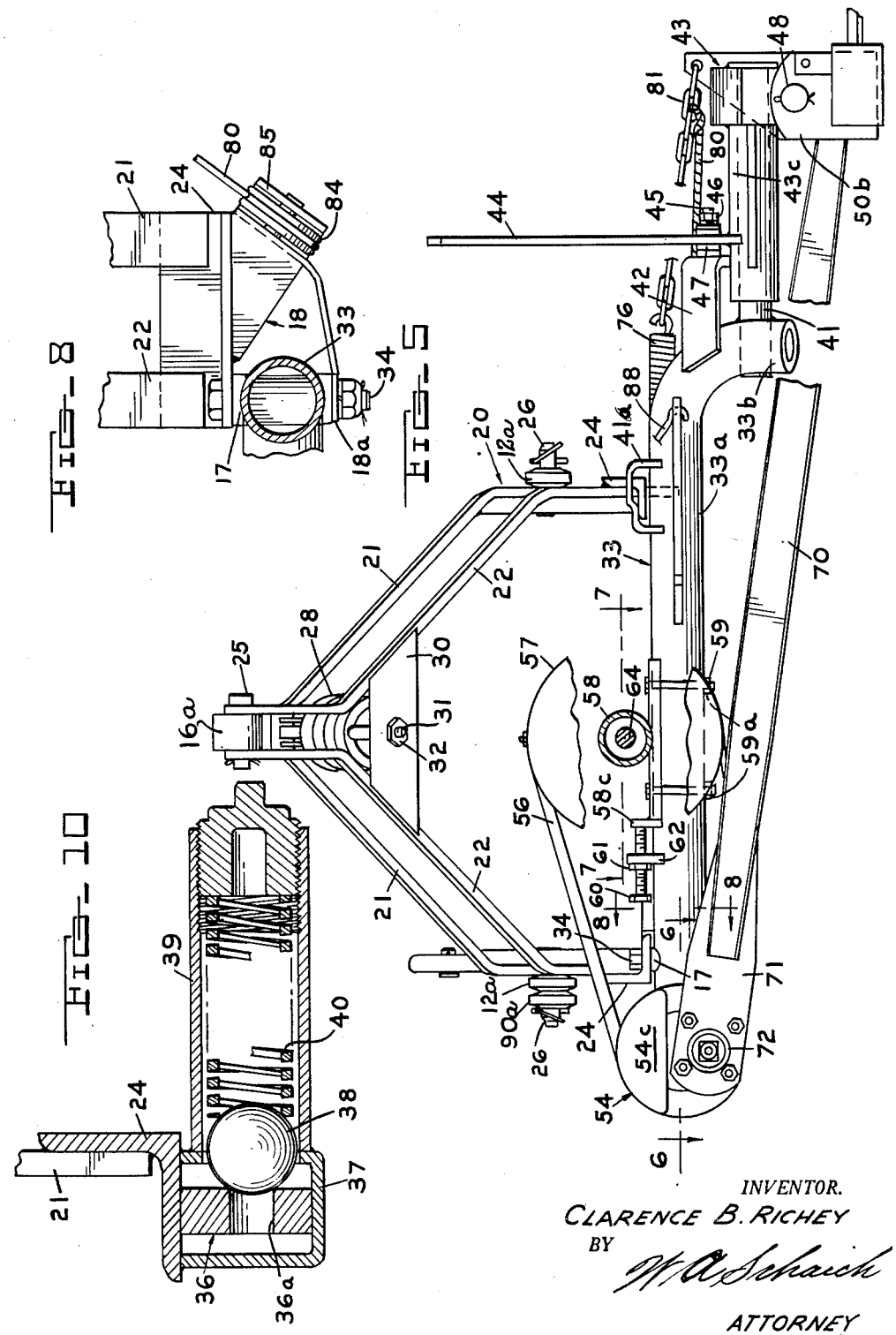
INVENTOR.
CLARENCE B. RICHEY
BY
W. A. Schaich
ATTORNEY

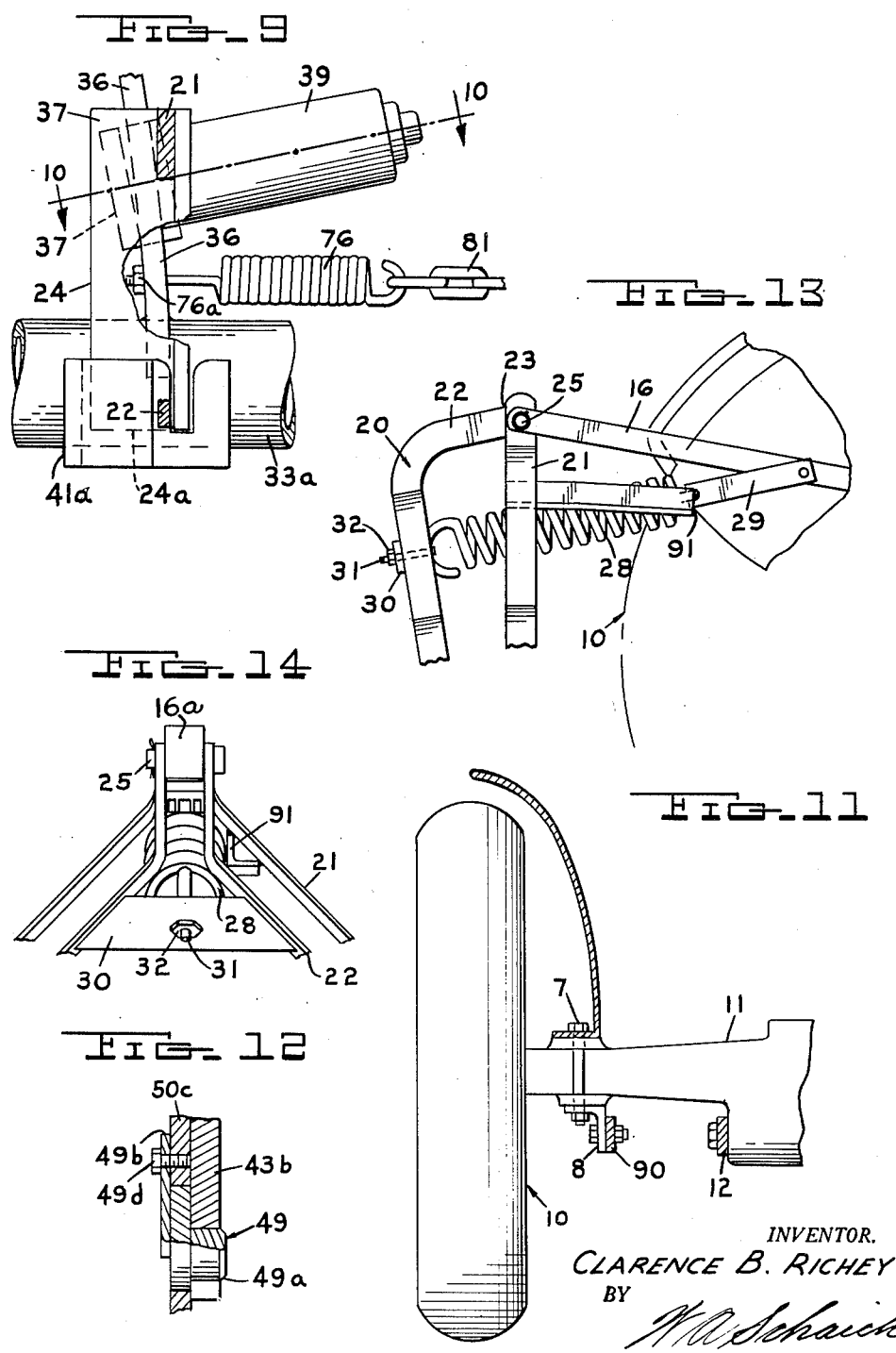

May 12, 1953 C. B. RICHEY 2,637,966
TRACTOR SUPPORT FOR MOWERS
Filed April 2, 1949 5 Sheets-Sheet 5
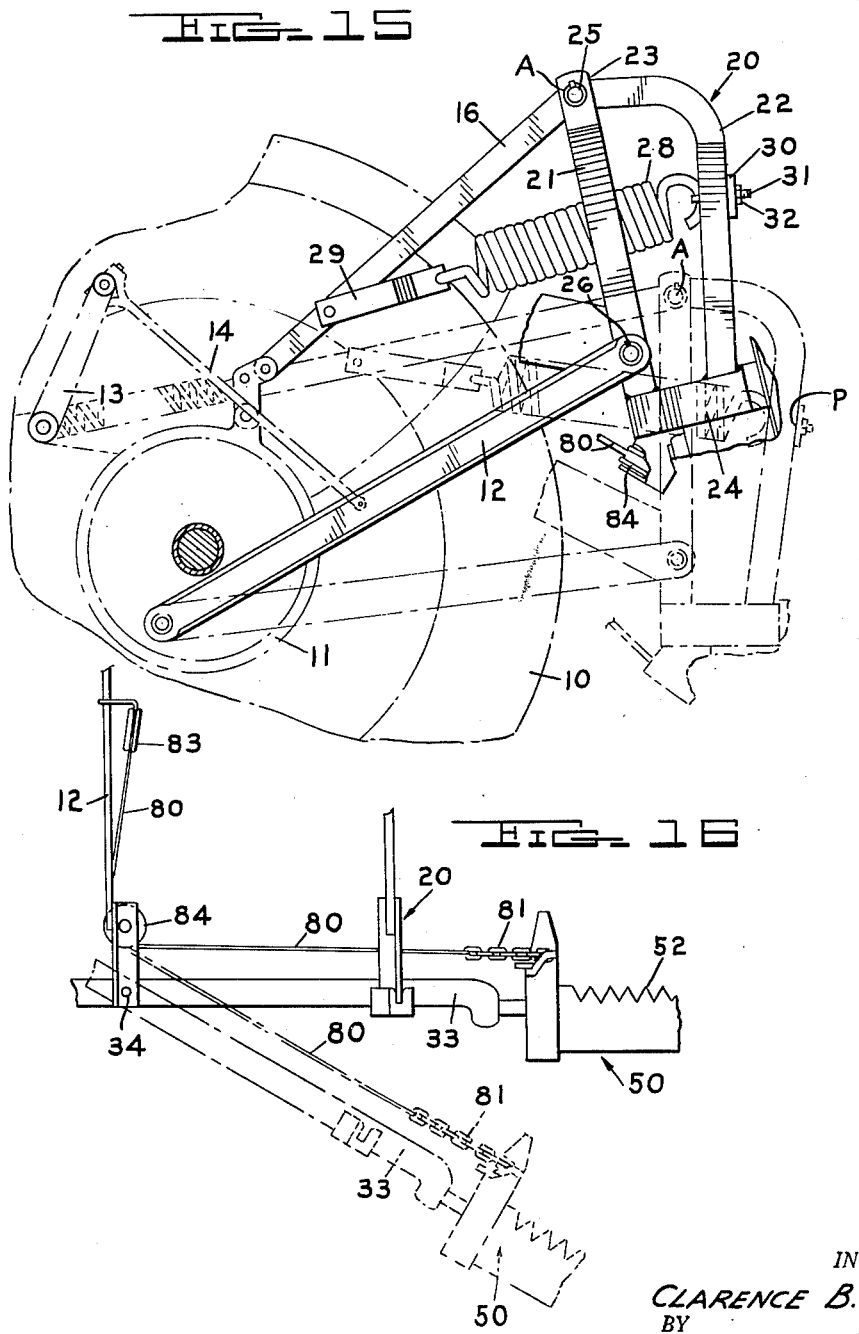
INVENTOR.
CLARENCE B. RICHEY
BY
W. A. Schaich
ATTORNEY

UNITED STATES PATENT OFFICE 2,637,966

TRACTOR SUPPORT FOR MOWERS

Clarence B. Richey, Royal Oak, Mich., assignor to Dearborn Motors Corporation, Highland Park, Mich., a corporation of Delaware Application April 2, 1949, Serial No. 85,214

15 Claims. (Cl. 56—25)

This invention relates to an improved farm implement construction, and particularly to a mower of the type employed with tractors or similar prime movers having hydraulically controlled vertically swingable drawbars.

In recent years, a substantial number of different mower constructions have been proposed for use with tractors having hydraulically-controlled, vertically-swingable drawbars, such for example as is provided as standard equipment upon the Ford tractor. By mounting the mower frame upon the hydraulically-controlled drawbars, it is, of course, possible to readily lift the entire mower unit to a lifted position with respect to the ground so that the mower may be conveniently transported to the area where the actual mowing is to be accomplished.

All such prior mower constructions have been subject to serious disadvantages. In the first place, by virtue of their substantially rigid connection to the tractor, an excessive amount of vibration has been transmitted from the mower to the tractor, resulting in not only unnecessary wear and shock to all of the moving parts of the tractor, but being, in addition, quite uncomfortable for the operator. Secondly, such known mower constructions have been subject to rapid deterioration and failure to remain in adjustment after very short periods of operation. Furthermore, the known constructions have been unusually complicated and expensive to initially manufacture or to maintain in proper operating condition.

A feature of this invention is the provision of an unusually simplified and economically manufacturable frame structure for a tractor-carried implement of the ground-following type. In accordance with this invention, such frame structure partakes of a rigid, generally inverted V-shaped configuration. A frame structure embodying this invention is particularly adaptable for use with tractors having a three-point connection arrangement commonly provided by a pair of transversely spaced, vertically swingable drawbars in cooperation with a centrally disposed link, and this invention contemplates that the vertex portion of the frame be pivotally connected to the central hitch link while each of the transversely spaced drawbars are respectively connected to side arm portions of the inverted V-shaped frame. A spring is then mounted between the rigid frame and the central hitch link of the tractor in such manner that the spring is stressed by the lowering of the drawbars and frame to ground engaging position, thus supporting a pre-determined portion of the weight of the implement. Furthermore, a particular feature of this invention lies in the disposition of such spring so that its effective lever arm decreases concurrently with any increase in the stressing of such spring, so that the proportion of implement weight supported by the spring is maintained substantially independent of the vertical position of the implement relative to the tractor. This permits the implement to bear against the ground with a substantially uniform pressure, and hence to readily follow a non-uniform ground surface. The attendant advantages in a mowing operation, in particular, are believed to be quite obvious.

A further feature of this invention lies in the mounting of a mower unit with respect to the tractor in such manner that the vibrations commonly set up in the mower unit due to the rapidly reciprocating cutting bar are not transmitted in any large degree to the tractor. According to this invention, the entire mower unit is permitted to have a limited degree of free lateral displacement with respect to the tractor, such displacement being sufficient to permit the entire frame of the mower unit to freely vibrate in opposition to the movements of the reciprocating cutter bar. At the same time, limiting means are provided between the mower and the tractor to prevent an excessive lateral displacement of the mower which would otherwise result when mowing in relatively heavy vegetation.

Still another feature of this invention is the mounting of a transversely extending mower support bar to the bottom portions of the rigid inverted V frame in such manner that one end of the mower support bar is vertically pivotally joined to the rigid frame while the other end is held in assembly therewith by a spring pressed detent arrangement. Such mower support bar is then utilized to support the cutter bar frame, and it is thus assured that whenever the cutter bar frame strikes an obstruction in the course of mowing, the detent engagement of the mower support bar with the main frame will be released and the mower support bar will pivot about its vertical connection with the main frame to prevent damage to the cutter bar and cutter bar frame. The cutter bar frame may be placed back into operative position by the simple expedient of backing the tractor or other prime mover until sufficient pivoting of the mower support bar is accomplished to produce reengagement of the spring pressed detent.

A mower constructed in accordance with this invention has the further advantage of utilizing the relative angular displacement which occurs between the mower frame and one of the tractor drawbars as such drawbars are elevated, to effect the tightening of a control cable to raise the outer end of the cutter bar unit. Furthermore, the control cable is so arranged with respect to the axis of movement of the cutter bar unit relative to the tractor, that the horizontal rearward swinging movement of the cutter bar upon the striking of an obstruction can occur without substantial effect on the vertical position of the cutter bar unit.

Furthermore, in accordance with this invention a unique pivoted joint is employed between the rigid main frame structure and the cutter bar frame. The cutter bar frame is pivotally suspended from a yoke member which in turn has a nested or telescoping engagement with a cylindrical projection provided on the rigid main frame. Such nested connection not only permits the convenient adjustment of the tilt of the cutter bar frame in the vertical plane, but also, by the provision of spacers cooperating with the clamping means by which the yoke is secured to the rigid main frame, permits convenient adjustment of the register of the teeth of the movable cutter bar with the fixed teeth of the cutter bar frame.

Accordingly, it is an object of this invention to provide an improved implement frame construction particularly adaptable for use with tractors or similar prime movers having vertically swingable drawbars.

A further object is to provide an improved spring suspension for implements of the ground-following type.

Another object of this invention is to provide a mower construction of unusual rigidity and long operating life which may be economically manufactured and conveniently adjusted or repaired to maintain such in optimum operating condition throughout the useful life of the mower.

Still another object of this invention is to provide an improved mower construction for use with tractors having hydraulically-controlled, vertically-swingable drawbars, characterized by the substantial elimination of transmission of vibrations from the mower to the tractor.

A further object of this invention is to provide in a mower an improved connection between the main frame and the cutter bar frame which will permit the convenient adjustment of both the tilt of the cutter bar frame and the registration of the movable cutter bar teeth with the fixed teeth of the cutter bar frame.

Still another object of this invention is the provision of an improved elevating mechanism for the cutter bar frame of a mower unit, wherein a cable is caused to be tightened by the relative change in displacement of the main frame of the mower unit with respect to one of the vertically-swingable drawbars of the tractor so that such cable effects the elevation of the outer end of the cutter bar frame from the ground concurrently with the raising of the drawbars of the tractor to an elevated position. Furthermore, such cable mechanism is so arranged as to be substantially unaffected by horizontal swingback movement of the cutter bar frame when an obstruction is encountered.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Figure 1 is a perspective view of a mower embodying this invention, showing it in assembled relation with respect to a tractor of the type having hydraulically-controlled, vertically-swingable drawbars;

Figure 2 is a side elevational view of the assembly of Figure 1 with the tractor wheel removed for clearer illustration;

Figure 3 is an enlarged scale, partial sectional view taken on plane 3—3 of Figure 2;

Figure 4 is an enlarged scale, partial plan view, of the end of the cutter bar frame which connects with the main frame;

Figure 5 is a rear elevational view of the mower unit with parts broken out in section for purposes of clarity;

Figure 6 is an enlarged scale partial sectional view taken on plane 6—6 of Figure 5;

Figure 7 is an enlarged scale, partial sectional view, taken on plane 7—7 of Figure 5;

Figure 8 is an enlarged scale partial sectional view, taken on plane 8—8 of Figure 5;

Figure 9 is an enlarged partial elevational view illustrating the cooperation of the spring present detent with the swing out support bar;

Figure 10 is an enlarged scale sectional view, taken on plane 10—10 of Figure 9;

Figure 11 is an elevational view, reduced scale partially in section, illustrating the manner of connection of the stabilizing link to the tractor axle frame;

Figure 12 is a partial sectional view taken on the plane 12—12 of Figure 3;

Figure 13 is a side elevational view of the top portion of the mower frame illustrating a modification of this invention for limiting side shift of the mower unit;

Figure 14 is a plan view of the modification of Figure 13;

Figure 15 is a schematic side elevational view illustrating the path of movement of an implement frame structure embodying this invention with respect to the tractor links, showing in full lines the raised position of the implement and in dotted lines the lowered or working position of the implement;

Figure 16 is a schematic plan view illustrating the working position of the cutter bar control cable in solid lines and in dotted lines its position during the horizontal swing-back movement of the cutter bar unit following the striking of an obstruction.

As shown on the drawings:

While not limited thereto, a farm implement embodying this invention is particularly adaptable for use with a prime mover of the type similar to the well-known Ford tractor, Model 3N. Referring particularly to Figures 1 and 2, this type of tractor embodies a pair of relatively large rear wheels 10 which are suitably supported at opposite ends of a rear axle casing 11. A pair of vertically-swingable drawbars or hitch links 12 are provided on this type of tractor, being pivotally secured to the bottom portions of the rear axle casing in transversely-spaced relationship thereon. The drawbars 12 are concurrently raised by a pair of hydraulically-actuated lifting levers 13. One drawbar 12 is connected to a corresponding lever 13 by an ordinary connecting link 14 while the other drawbar 12 is connected to the lifting lever 13 by an adjustable length link 15. In addition, a central hitch link 16 is provided, being pivotally mounted on the tractor at a central position relatively above the drawbars 12, such as at the top of the axle casing 11. As is customary, the pivotal connections of the drawbars 12 and central hitch link 16 to the tractor incorporate spherical-type bearings 12a and 16a, respectively, so that both vertical and lateral movements of such links relative to the tractor are possible.

In accordance with this invention, a rigid main frame unit for a ground-following type of implement is provided which is of a generally inverted V-shaped configuration. Such main frame 20 is of rigid articulated construction having each of its side portions defined by a pair of generally parallel strips 21 and 22. The strips 21 and 22 are rigidly connected together at the vertex of the frame 20 as indicated at 23 and at their bottom ends, the strips are rigidly secured by generally horizontally disposed angle bars 24. The vertex portion of the inverted V frame 20 is pivotally secured to the free end of the central hitch link 16 by the customary spherical-type bearing 16a and the side arm portions of the inverted V frame 20 are respectively pivotally connected to the free ends of the drawbar links 12, again employing spherical-type bearings 12a. The free end of the central hitch 16 projects between the spaced top portions of strips 21 and 22 and is pivotally secured thereto by the conventional pin 25. Pivot pins 26 are respectively mounted on each of the strips 21 in transverse, outwardly projecting relationship and are pivotally engaged by spherical-type bearings 12a in the ends of drawbar links 12.

With such frame construction, it is apparent that as the drawbars 12 are raised or lowered, the angular relationship between the central hitch link 16 and the frame 20 will vary. This is more clearly shown in the schematic view of Figure 15. In accordance with this invention, advantage is taken of this variance to produce a spring suspension of a pre-determined proportion of the weight of the implement when it is lowered to its ground-following position. Thus, a tension spring 28 is suitably connected at one end to a medial portion of the hitch link 16 by a connector 29. The other end of spring 28 is secured to a cross bar 30 which is rigidly secured across a medial portion of the strips 22. This connection of the spring to the cross bar 30 is effected by an eye bolt 31 which projects through a suitable hole in cross bar 30, and the effective tension exerted by the spring 28 may be conveniently adjusted by a nut 32 on the threaded end of the eye bolt 31.

It should be noted that the provision of the cross bar 30 permits the description of the frame 20 as an A frame and reference will be had to such description for convenience in terminology hereafter.

Pursuant to this invention, the location of the spring 28 with respect to the main frame of the ground-following implement is such that the effective lever arm of the spring is decreased concurrently with an increase in the tension applied to such spring as a result of the lowering of the implement to ground-engaging position. This relationship is more clearly illustrated in the schematic view of Figure 15, wherein it will be noted that the distance between the axis of the spring 28 and the effective fulcrum A of such spring, defined by the pivotal connection between the frame and the central hitch link 16, decreases as the drawbars 12 are lowered to ground-engaging position. This feature may be advantageously employed so as to substantially compensate for the variance in spring tension that would commonly occur while the implement is following a non-uniform ground contour. Hence, the proportion of the implement weight supported by the spring 28 may be maintained substantially uniform irrespective of variance in the ground contour. This fact is of substantial importance, for it means that the particular implement carried by the main frame will bear against the ground with equal force irrespective of whether it is traversing a mound or a valley portion of the ground contour. Such feature is of particular utility in mowers, and accordingly, this feature of the invention has been particularly illustrated and described as applied to a mower construction, but its utility is obviously not limited to any specific type of ground-following implement.

At the lower extremities of the main frame 20, a mower support bar 33 is mounted in transverse relation. The support bar 33 may be conveniently formed of tubing and has an elongated horizontal portion 33a underlying the entire main frame 20 and an integral depending portion 33b which depends from whichever side of the main frame that it is desired for the cutter bar of the mower unit to be mounted. In the particular example herein described, the cutter bar is mounted on the right hand side of the tractor. The left hand angle bar 24 of frame 20 has a bracket 18 welded thereto which has a flange portion 18a disposed in spaced, parallel relation beneath angle bar 24 (Figure 8).

The left hand end of the mower support bar 33 is pivotally secured between angle bar 24 and bracket flange 18a by a vertically disposed bolt and nut unit 34 which is journalled in a sleeve 17 which traverses the bar 33. The right hand end of the mower support bar 33 is resiliently latched in an operating position with respect to the main frame 20 by virtue of having an arcuate bar 36 welded thereto and projecting forwardly into a guide channel defined by a U-shaped bracket 37 (Figures 9 and 10) which is secured in depending relationship to the right hand angle bar 24 of the main frame 20. As is best shown in Figures 9 and 10, the arcuate bar 36 has a locking notch of hole 36a formed therein, which is engaged by a ball detent 38 supported in a horizontal housing 39 welded to the side walls of bracket 37. Ball 38 is urged by a spring 40 into latching engagement with the latching hole 36a. Accordingly, the mower support bar 33 is resiliently retained in its perpendicularly transverse operating position with respect to the main frame 20 but may be released from such position to swing rearwardly about the vertical axis defined by bolt 34 whenever the cutter bar unit carried by such frame in a manner to be hereafter described, strikes an obstruction. To further facilitate the rigidity of the securement of the support bar 33 with respect to the main frame 20, a U-shaped bracket 49a is welded to the top of the right hand portion of the support rod 33 in inverted relationship and such bracket slides snugly over the rear end portion 24a of the angle bar 24 at the bottom right hand end of the main frame 20.

As was previously mentioned, the mower support bar 33 has a depending portion 33b at its right hand end. The depending portion is employed to mount the cutter bar frame 50 of the mower unit. Such mounting is accomplished in accordance with this invention by a horizontally disposed cylindrical pin 41 which is rigidly secured to depending portion 33b in laterally projecting relationship. Immediately above the pin 41, a U-shaped bracket 42 is welded to depending portion 33b and the bight portion of the bracket 42 is provided with an arcuate slot 42a (Figure 4) for a purpose to be hereafter described.

A yoke 43 is provided which has spaced depending arm portions 43a and 43b and a horizontally disposed, laterally projecting sleeve portion 43c which is mountable upon the projecting pin 41 carried by the mower support bar 33. To secure the yoke 43 in any selected one of a plurality of different angular positions relative to the pin 41, a tilting lever 44 is welded to sleeve portion 43c in radial relationship thereto. A clamping bolt 45 is then passed through a suitable aperture in the tilting lever 44 and into the arcuate slot 42a provided in the U-shaped bracket 42. By tightening a nut 46 on the bolt 45, it is apparent that the angular position of the yoke 43 relative to the mower support bar 33 may be conveniently adjusted. Furthermore, by suitable interposition of a selected number of spacer washers 47 between the tilting lever 44 and the adjacent face of the bracket 42, the transverse position of the yoke 43 with respect to the main frame 20 may also be conveniently adjusted. As will be later apparent, any angular adjustment of the yoke 43 with respect to the mower support bar 33 results in an adjustment of the tilt of the cutter bar frame 50, while the transverse adjustment of the yoke 43 with respect to the support bar 33 accomplishes adjustment of the registration of the cutting teeth 53a of the movable cutter bar 53 (to be described) with respect to the fixed teeth 52 of the cutter bar frame.

The cutter bar frame 50 is of conventional construction having at the rear edge of its tractor adjacent end, a pair of spaced upstanding brackets 50a and 50b receiving a pin 48 by which the cutter bar frame is pivotally secured to the depending arm of the yoke 43 for movement in a substantially vertical plane. At its forward edge, the cutter bar frame 50 has an upstanding portion 50c which journals an adjusting plug 49 having a rearwardly projecting eccentrically disposed pin portion 49a. (Figures 2, 3 and 12.) Pin portion 49a in turn pivotally engages arm 43b of yoke 43. Plug 49 has a flange portion 49b overlying the surface of frame portion 50c and such flange portion has a plurality of arcuately spaced holes 49c to selectively receive bolts 49d and thus determine the eccentric position of pin portion 49a. Such adjustment permits the cutter bar to be maintained at the desired angular relation to the path of travel and also provides a take up of excessive clearance developed by wear of the pivots supporting cutter bar frame 50.

The cutter bar frame 50 projects laterally beyond the tractor to a considerable extent and defines a plurality of laterally spaced, forwardly projecting, stationary teeth 52. A cutter bar 53 of conventional configuration is suitably slidably supported on cutter bar frame 50 for lateral reciprocating movements relative thereto. The cutter bar 53 is provided with cutting teeth 53a which are similarly spaced as the stationary teeth 52. The teeth 53a of cutter bar 53 have sharpened edges and cooperate with the stationary teeth 52 to cut any vegetation trapped therebetween in conventional fashion.

To impart a laterally reciprocating movement to the cutter bar 53, an eccentric 54 is journalled in a bearing bracket 55 which is suitably rigidly secured to the left hand end of mower support bar 33. Eccentric 54 embodies a pulley portion 54a which is driven by a belt 56 from a main driving pulley 57. On the rear face of eccentric 54 a projecting crank pin 54b and a counter weight 54c are suitably mounted. A pitman 70 is suitably secured to crank pin 54b as by mounting plate 71 and bearing 72, and at its other end pitman 70 is connected to the cutter bar 53 by a spherical bearing type joint 73. Hence, when pulley 57 is driven, pitman 70 will impart a lateral reciprocating movement to cutter bar 53 whenever such bar is in a horizontal or inclined position, but will not interfere with the movement of the cutter bar frame 50 to a substantially vertical, transport position.

The main drive pulley 57 is journalled in a bearing bracket 58 (Figure 7) which, in turn, is adjustably mounted on the central portions of the mower support bar 33. For example, the pulley bracket 58 may comprise a base portion 58a which is bolted to mower support bar 33 by a plurality of bolts 59. Bolts 59 pass through elongated slots 58b in base 58a and hence permit bearing bracket 58 to be clamped in any selected lateral position along the mower support bar 33 by the tightening of nuts 59a. To conveniently effect a controlled limited lateral adjustment of the position of the main pulley bearing bracket 58, an adjusting screw 60 is provided which is threadably mounted in an upstanding lug 62, rigidly secured to mower support bar 33. The adjusting screw 60 extends generally parallel to the mower support bar 33 and the end thereof engages an upstanding ear 58c formed on bearing bracket 58. Hence the bearing bracket 58 may be adjusted to any selected lateral position at which a desired tightness is produced in the belt 56 and the adjusting screw 60 may be locked in such position by a lock nut 61.

The drive pulley 57 is supported by a shaft 64 which projects forwardly through the bearing bracket 58 and is connected by a universal joint 65 to a telescopically extensible drive shaft 66. The other end of telescopic drive shaft 66 is connected by another universal joint to the power take-off shaft 9 of the tractor in conventional fashion. It is therefore apparent that the mower unit may be raised or lowered as desired without interference with the driving connection to the drive pulley 57 and that in any position of the mower unit, the drive pulley 57 may be driven from the power take-off shaft 9 of the tractor.

As was previously mentioned, the connection of the main frame 20 of the mower unit to the drawbars 12 and central hitch member 16 of the tractor is so arranged that as the mower unit is raised or lowered by the vertically swingable drawbars 12, the angular relationship of the main frame with respect to the drawbars will vary. Advantage is taken of such variation to conveniently effect the elevating of the outer end of cutter bar frame 50 so that such will be suspended above the ground upon the initial upward movement of the A frame produced by the vertically swingable drawbars. This is accomplished by a cable 80 which has one end suitably secured to the inner end of the cutter bar frame 50 as by being connected to one of the links of the cutter bar frame support chain 81. The other end of cable 80 is suitably secured, as indicated at 82, to a medial portion of one of the vertically swingable drawbars. The intermediate portions of the cable 80 are trained over suitable guide pulleys such as indicated at 83 (Figure 1) and 84 (Figure 8) mounted upon the main frame 20. For example, the pulley 83 is disposed in the outer end of a U-shaped housing 75 which projects forwardly and upwardly from the bottom portions of the A frame. The guide pulley 84 is suitably journalled in a U-shaped bracket 85 secured to the mounting bracket 18 and is located as close as possible to the axis of swing back movement of the support bar 33. The length of cable 80 is so adjusted that when the main frame 20 is dropped to its lowermost position by the drawbars 12, the cable 80 will be slack and cutter bar frame 50 will engage the ground over which it is to travel. To provide for an even distribution of the ground engaging force over the entire width of the cutter frame, a counterbalancing connection is provided between cutter bar frame 50 and main frame 20, comprising the chain 81 which connects to a tension spring 76 which has its other end secured to the arcuate bar 36 by an adjustable nut 76a. However, when the A frame is raised by the drawbars, the slack in cable 80 is taken up and the resulting tension thereby produced exerts a lifting action on the cutter bar frame 50 tending to pivot the outer end thereof upwardly to suspend such at a more elevated position to facilitate the transport of the mower.

When the mower unit is to be transported over substantial distance, and particularly when going from field to field or from the barn to the field, it is desirable that the cutter bar frame 50 be carried in a substantially upright position so as to avoid interference with narrow gateways or obstructions along the side of the road. As was previously pointed out, the cutter bar frame 50 may be readily pivoted to such upright position about the pivotal axis provided by yoke 43 and may be retained in such position by the engagement of a retaining rod 38 therewith which has its other end suitably secured to the mower support bar 33.

As has been previously described, whenever the cutter bar frame 50 is in its mowing position and strikes an obstruction, the detent securement of the mower support bar 33 to main frame 20 is released to permit the mower support bar 33 and the attached cutter bar frame 50 to swing horizontally rearwardly relative to the tractor as the tractor continues its forward movement. With any ordinary direct connection of the cable 80 to the cutter bar frame, such swing-back movement would necessarily produce a tightening of the cable 80 and hence there would be a tendency for the outermost end of the cutter bar frame to be raised. Such tendency would be very undesirable as it would tend to scrape the fixed teeth of the cutter bar frame upwardly along the obstruction and, if the obstruction were of wood or fibrous nature, would effect a digging in of the teeth with the attendant production of excessive strain on the entire mower unit in order to pull away from the obstruction. By the training of the cable 80 over the guide pulley 84 which is located closely adjacent to the axis of the swing-out movement of the mower support bar 33, such swing-back movement can readily occur without producing any substantial tightening of the cable 80. This condition is most clearly illustrated in the schematic view of Figure 16 of the drawings wherein it will be observed that the effective distance between the two secured ends of the cable 80 is substantially the same in the obstruction clearing position of the cutter bar frame 50 indicated by the dotted lines, as in the operating position indicated by the solid lines.

From the foregoing description, it is apparent that the entire mower unit, including both the main frame 20 and the cutter bar frame 50 may oscillate along a transverse path with respect to the tractor. Such oscillating movement is permitted by virtue of the spherical type bearing connections 12a and 16a between the main frame 20 and each of the drawbar links 12 and the central hitch link 16, respectively. It is therefore apparent that the entire mower unit 20 may vibrate in opposition to the reciprocating movements of the cutter bar without transmitting any substantial amount of such vibration to the tractor. Heretofore, tractor carried mower constructions have generally embodied a transversely rigid connection of the mower unit to the frame of the tractor and hence lateral vibrations of the mower unit in opposition to the reciprocating movements of the cutter bar were directly transmitted to the tractor frame.

This invention further contemplates the provision of means for limiting excessive lateral displacement of the mower unit with respect to the tractor which would tend to be produced when mowing heavy vegetation. In the modification of this invention illustrated in Figures 1–12 of the drawings, such limitation is effected by the addition of a conventional stabilizer link 90 to that side of the mower frame 20 which is opposite to the location of the cutter bar frame 50. Stabilizer link 90 is pivotally mounted to the tractor by a depending bracket 6 which is secured to the axle casing 11 by bolts 7. The axis of such pivotal connection of the stabilizing link 90 is in alignment with the axis of the pivotal connection of the drawbar links 12 so that no interference with the vertical movements of the drawbar links 12 is produced. At its outer end, the stabilizing link 90 is mounted on the same pivot pin 26 which effects a securement of the left hand drawbar link 12. Again, spherical-type bearings 90a are employed at both ends of the stabilizer link 90 and the fit of such bearings on the pivot pin is normally sufficiently loose to permit a slight amount of lateral reciprocating movement of the main frame 20 relative to the tractor, generally on the order of one inch, but will limit any tendency of the main frame 20 to be excessively laterally displaced during the mowing operation. Hence all of the advantages of free vibration of the entire mower unit relative to the tractor are retained.

In Figures 13 and 14 there is illustrated a modified arrangement for effecting limitation of excessive lateral displacement of the mower unit without substantial interference with the lateral vibration of the mower unit with respect to the tractor. In this modification, a rigid bar 91, which may conveniently comprise a piece of angle iron, is rigidly secured to the right hand side of the main frame 20 in forwardly projecting relationship thereto so as to lie adjacent to the suspension spring 28. Hence any tendency of the mower frame 20 to be excessively laterally displaced will be yieldingly resisted by the engagement of the bar 91 with the side of the spring 28. Here again, substantially no interference with the lateral vibratory movements of the mower frame 20 will be produced.

It should be remembered that due to the very great difference in the total effective weight of the mower frame 20 and the cutter bar frame 50 as compared to the weight of the cutter bar 52, the vibratory movements of the main frame 20 in opposition to the movements of the cutter bar 53 will necessarily be on the order of a fraction of an inch. Both of the described arrangements permit vibratory movements of this magnitude but limit any tendency of the mower unit to be excessively laterally displaced with respect to the tractor.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A mower comprising a main frame adapted for securement to a vehicle, a cutter bar frame, stationary teeth means on said cutter bar frame, a toothed cutter bar movably mounted on said cutter bar frame and cooperating with said stationary teeth means to produce a cutting action, means carried by said main frame and connected to said cutter bar for reciprocating said cutter bar relative to said cutter bar frame, means for securing said cutter bar frame to said main frame comprising a pair of nested cylindrical members respectively secured to said main frame and said cutter bar frame and disposed in substantial parallelism with said cutter bar, means for securing said nested cylindrical members in any selected one of a plurality of angularly displaced positions, thereby selectively adjusting the tilt of said cutter bar frame, and spacer means cooperating with said securing means for selectively shifting the relative axial position of said nested cylindrical members, thereby adjusting the register of said cutter bar teeth with said stationary teeth means.

2. A mower comprising a main frame, a cutter bar frame, a cylindrical pin secured to said main frame in laterally projecting relationship, a sleeve secured to one end of said cutter bar frame and receiving said pin in nested relationship, a tilting lever rigidly secured to said sleeve in generally radial relation, said main frame having a slot adjacent said tilting lever, and bolt means traversing said tilting lever and said slot for detachably securing said tilting lever to said main frame in any one of a plurality of angularly spaced positions relative to the axis of said pin, whereby the angle of tilt of said cutter bar frame may be selectively adjusted.

3. A mower comprising a main frame, a cutter bar frame, a cylindrical pin secured to said main frame in laterally projecting relationship, a sleeve secured to one end of said cutter bar frame and receiving said pin in nested relationship, a tilting lever rigidly secured to said sleeve in generally radial relation, and means for detachably securing said tilting lever to said main frame in any one of a plurality of angularly spaced positions relative to the axis of said pin, whereby the angle of tilt of said cutter bar frame may be selectively adjusted, and spacer means interposed between said tilting lever and said main frame to selectively adjust the lateral position of said cutter bar frame relative to said main frame.

4. A mowing implement for a tractor or the like having a pair of laterally spaced, vertically swinging drawbars and a central hitch member disposed above the drawbars, comprising, in combination, a rigid frame of generally inverted V configuration, means for pivotally connecting the vertex portions of said inverted V frame to the tractor central hitch member, means for respectively pivotally connecting the side arm portions of said inverted V frame to the tractor drawbars, a mower support bar, a mower unit carried by said support bar, means on the bottom portion of said inverted V frame for pivotally securing said support bar thereto on a substantially vertical axis, a horizontally disposed arcuate guide bar secured to said support bar in spaced relationship to said vertical axis and having a curvature in a horizontal plane substantially corresponding to an arc swung about said vertical axis, means on said inverted V frame for slidably supporting said guide bar, and spring pressed detent means carried by said inverted V frame and engaging said guide bar for resiliently securing said mower support bar in a working position relative to said inverted V frame, whereby an obstruction encountered by said mower unit will produce the release of said detent means and the pivoting of said mower support bar about said vertical axis to clear the obstruction.

5. A mowing implement for a tractor or the like having a power take-off, a pair of laterally spaced, vertically swinging drawbars and a central hitch member disposed above the drawbars comprising, in combination, a rigid articulated frame of generally inverted V-shaped configuration, means for pivotally connecting the vertex portions of said inverted V frame to the tractor central hitch member, means for respectively pivotally connecting the side arm portions of said inverted V frame to the tractor drawbars, a laterally extending mower support bar, a mower unit carried by said support bar, means on the bottom portion of said frame for pivotally securing said support bar thereto on a substantially vertical axis, a horizontally disposed arcuate guide bar secured to said support bar in spaced relationship to said vertical axis and having a curvature substantially corresponding to an arc swung about said vertical axis, means on said inverted V frame for slidably supporting said guide bar, spring pressed means on said inverted V frame and cooperable with said guide bar for resiliently securing said mower support bar in a working position relative to said frame, whereby an obstruction encountered by said mower unit will produce the release of said spring pressed means and the pivoting of said mower support bar about said vertical axis to clear the obstruction, a bearing bracket slidably mounted on the central portion of said support bar, a pulley journalled in said bearing bracket, extensible universal joint means adapted for attachment to the tractor power take-off for driving said pulley, a second bearing bracket mounted on said support bar, a second pulley journalled in said second bearing bracket, an eccentric carried by said second pulley, a pitman interconnecting said eccentric and said cutter bar, a belt drivingly connecting said first and second pulleys, and means for securing said first bearing bracket in a position on said support bar selected to produce a desired tension in said belt.

6. In combination, a tractor having a pair of laterally spaced, vertically swinging drawbars and a central hitch member, power means for raising and lowering said drawbars, a rigid mower frame, means for respectively pivotally connecting said central hitch member and said drawbars to triangularly spaced points on said mower frame, whereby the angular position of at least part of said mower frame relative to one of said drawbars varies as said drawbars are raised or lowered, a cutter frame pivotally supported on said mower frame for movement in a substantially vertical plane, and a support cable having one end thereof secured to said cutter frame, the other end secured to said one drawbar, and means rigidly carried by and movable with said part of said mower frame and receiving said cable thereabout, whereby raising of said drawbars by said power means to raise said mower frame effects tightening of said cable to exert a lifting force on said cutter frame to sustain such above the ground.

7. In combination, a tractor having a pair of laterally spaced, vertically swinging drawbars, and a central hitch member, power means for raising and lowering said drawbars, a rigid articulated mower frame of generally inverted V-shaped configuration, means for pivotally connecting the vertex portions of said mower frame to the tractor central hitch member, means for respectively pivotally connecting the side arm portions of said mower frame to the tractor drawbars, whereby the angular position of at least part of said mower frame relative to one of said drawbars varies as said drawbars are raised or lowered, transversely extending mower support bar secured to the bottom portions of said mower frame, a cutter frame pivotally suspended from said support bar for movement in a substantially vertical plane, and a support cable having one end thereof secured to said cutter frame, the other end secured to said one drawbar, and its medial portion trained over said part of said mower frame, whereby raising of said drawbars by said power means to raise said frame effects tightening of said cable to exert a lifting force on said cutter frame to suspend such above the ground.

8. In combination, a tractor having a pair of laterally spaced, vertically swinging drawbars and a central hitch member, means for raising and lowering said drawbars, a rigid mower frame, means for respectively pivotally connecting said central hitch member and said drawbars to triangularly spaced points on said mower frame, whereby the angular position of at least part of said mower frame relative to one of said drawbars varies as said drawbars are raised or lowered, a mower support member pivotally secured to said main frame on a vertical axis, latch means for resiliently retaining said mower support member in a working position relative to said main frame, a cutter bar unit pivotally mounted to the non-pivoted end of said mower support member for movement in a vertical plane, and a support cable having one end thereof secured to said cutter frame, the other end secured to said one drawbar, means for training one medial portion of said cable over said part of said mower frame, whereby raising of said drawbars to raise said mower frame effects tightening of said cable to exert a lifting force on said cutter frame to elevate the outer end thereof, and means for training another medial portion of said cable to pass adjacent said vertical axis in substantial longitudinal alignment therewith, whereby horizontal swinging of said cutter bar unit about said vertical axis when an obstruction is encountered will not substantially vary the effective length of said cable to prevent concurrent vertical shifting of said cutter bar unit.

9. A mower comprising a main frame adapted for securement to a movable vehicle, a cutter bar frame, a yoke having spaced arm portions pivotally secured to one end of said cutter bar frame for relative movement about a first horizontal axis, a pair of nested cylindrical members respectively rigidly secured to said main frame and said yoke, said nested cylindrical members having a substantially horizontal axis transverse to said first horizontal axis, a tilting lever secured to said yoke, means on said main frame defining an arcuate slot adjacent to said tilting lever, said slot having a radius swung about the axis of said nested cylindrical members, and bolt means traversing said tilting lever and said arcuate slot for clamping said yoke and said main frame in any selected relative angular position about the axis of said nested cylindrical members, whereby the tilt of the cutter bar frame may be adjusted and the cutter bar frame may be shifted between a horizontal working position and an upright carrying position independently of the tilt adjustment.

10. In a mowing implement for a tractor-type prime mover having a pair of laterally spaced, power-liftable drawbars and a central hitch member, a rigid articulated frame of generally inverted V-shaped configuration, means pivotally connecting the vertex portion of said inverted V frame to the tractor central hitch member for relative angular movement, means respectively pivotally connecting the side arm portions of said inverted V frame to the tractor drawbars, the angle between said central hitch member and said frame increasing as said frame is lowered by said drawbars, a mower support member connected to the bottom portions of said inverted V frame for movement therewith as said frame is moved vertically, a mower unit carried by said mower support member, a spring connected between said inverted V frame and said tractor central hitch member, said spring tending to align said frame with said central hitch member, and means for adjusting the effective length of said spring, whereby said spring is stressed to support a selected proportion of the weight of said mower unit as said tractor drawbars lower to increase the angle between the central hitch member and the frame against the resistance of said spring.

11. In a mowing implement for a tractor-type prime mover having a pair of laterally spaced, power-liftable lower links and a central top link, a rigid articulated frame of generally A-shaped configuration including a cross bar portion, means pivotally connecting the vertex portion of said A frame to the tractor top link, means pivotally connecting the side arm portions, respectively, of said A frame to the tractor lower links for movement therewith, said top link and said frame being relatively angularly movable upon vertical movement of said frame, a mower support member connected to the bottom portions of said A frame for movement therewith as said frame is moved vertically, a mower unit carried by said mower support member, and a spring connected between the cross bar portion of said A frame and said tractor top link, said spring being increasingly stressed upon relative angular movement of said frame and said top link as said frame is lowered, and the effective lever arm through which the spring acts at the point of connection of said frame and said top link decreasing in length in substantial proportion to the increased stressing of said spring, so that the applied force of the spring and the portion of the weight of the frame supported thereby remains substantially constant over a range of frame movement.

12. In a mowing implement for a tractor type prime mover having a pair of trailing laterally spaced, vertical swinging drawbars and a trailing central hitch member, a rigid articulated frame of generally A-shaped configuration including a cross bar portion, means for pivotally connecting the vertex portion of said A frame to the tractor central hitch member, means for respectively pivotally connecting the side arm portions of said A frame to the tractor drawbars, said frame being angularly shiftable relative to said hitch member during vertical movement of said drawbars by virtue of the frame pivoted connection to the drawbars and hitch member, a mower support member connected to the bottom portions of said A frame for movement therewith as said frame is moved vertically, a mower unit carried by said mower support member, a tension spring connected between the cross bar portion of said A frame and said tractor central hitch member and resisting any increase in the angle therebetween and means for adjusting the effective length of said spring, whereby said spring is stressed to resiliently support a selected proportion of the weight of said mower unit as said frame is lowered on said drawbars and the angle between said frame and said hitch member increases.

13. In a ground-following implement for use with a tractor having trailing vertically swingable draft links, one of which swings about an axis vertically spaced from the other, a rigid implement supporting frame, means pivotally securing said frame to said drawbars so that the angular relationship of said frame to said one link and the displacement of a portion of said frame from a medial portion of said one link varies as said links are lowered, and a spring mounted between said frame portion and said medial portion of said one link, said spring being increasingly stressed as said links are lowered, said spring acting on said frame through an effective lever arm extending from said spring to the point of connection of said frame to said top link, the length of said arm decreasing as said spring is increasingly stressed so that the applied force of said spring remains substantially constant.

14. In combination with a tractor having trailing vertically swingable drawbars at least one of said drawbars having a pivotal axis vertically spaced from the pivotal axis of another drawbar, a ground following implement comprising a rigid frame, means pivotally securing said frame to said drawbars at spaced points on said frame so that the effective angle between said frame and said one drawbar varies as said drawbars and frame are lowered, and a spring connected between said frame and said one drawbar, said spring resisting any increase in said effective angle and being stressed by downward movement of said frame and drawbars, said spring being further located relative to said pivotal connection between said one drawbar and said frame so that the length of the effective lever arm of the force exerted by said spring decreases as said frame and drawbars are lowered, whereby the applied force of the spring and the portion of the weight of said frame supported by said spring is maintained substantially constant over a range of vertical movement of said frame.

15. In a mowing implement for use with a tractor having trailing vertically swingable draft links, one of which swings about an axis vertically spaced from the other, a rigid implement frame, means pivotally securing said frame to said drawbars so that the angular relationship of said frame to said links and the displacement of a portion of said frame from medial portions of said links varies as said links move vertically, a spring mounted between said frame portion and said medial portion of said one link, said spring being increasingly stressed to support a portion of the weight of said frame as said links are lowered, a cutter bar frame pivotally supported on said implement frame for movement in a substantially vertical plane, a support cable having one end secured to another of said links and its other end secured to said cutter bar frame, and means receiving an intermediate portion of said cable thereabout, said means being rigidly carried by and movable with said implement frame portion for angular movement relative to said another link away from said cutter bar frame upon elevation of said links to tension said cable, thereby exerting a lifting force on said cutter bar.

CLARENCE B. RICHEY.

References Cited in the file of this patent

UNITED STATES PATENTS

| Number | Name | Date |
|---|---|---|
| 1,911,387 | Pearson | May 30, 1933 |
| 1,915,548 | Paul | June 27, 1933 |
| 1,973,993 | Pearson | Sept. 18, 1934 |
| 2,248,022 | Geraldson | July 1, 1941 |
| 2,335,510 | Hansen | Nov. 30, 1943 |
| 2,422,044 | Ronning et al. | June 10, 1947 |
| 2,457,693 | Leicy | Dec. 28, 1948 |
| 2,550,412 | Girardi | Apr. 24, 1951 |